(12) United States Patent
Yuan et al.

(10) Patent No.: US 8,185,605 B2
(45) Date of Patent: May 22, 2012

(54) METHODS AND APPARATUSES FOR ACCESSING AN APPLICATION ON A REMOTE DEVICE

(75) Inventors: Eric Yuan, San Jose, CA (US); Matthew Sheppard, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 636 days.

(21) Appl. No.: 11/458,241

(22) Filed: Jul. 18, 2006

(65) Prior Publication Data

US 2008/0021975 A1    Jan. 24, 2008

(51) Int. Cl.
    *G06F 15/16* (2006.01)
(52) U.S. Cl. ......... 709/217; 709/229; 709/225; 709/203
(58) Field of Classification Search .......... 709/217–219, 709/223–224, 203, 229, 225
    See application file for complete search history.

(56) References Cited

U.S. PATENT DOCUMENTS

| | | |
|---|---|---|
| 5,062,060 A | 10/1991 | Kolnick |
| 5,107,443 A | 4/1992 | Smith et al. |
| 5,430,719 A | 7/1995 | Weisser, Jr. |
| 5,491,795 A | 2/1996 | Beaudet et al. |
| 5,522,025 A | 5/1996 | Rosenstein |
| 5,577,188 A | 11/1996 | Zhu |
| 5,623,603 A | 4/1997 | Jiang et al. |
| 5,708,780 A | 1/1998 | Levergood et al. |
| 5,758,110 A | 5/1998 | Boss et al. |
| 5,760,769 A | 6/1998 | Petrie |
| 5,805,846 A | 9/1998 | Nakajima et al. |
| 5,844,553 A | 12/1998 | Hao et al. |
| 5,892,511 A | 4/1999 | Gelsinger et al. |
| 5,944,791 A | 8/1999 | Scherpbier |
| 5,987,611 A | 11/1999 | Freund |
| 5,995,103 A | 11/1999 | Ashe |
| 6,023,730 A | 2/2000 | Tani |
| 6,167,432 A | 12/2000 | Jiang |
| 6,223,212 B1 | 4/2001 | Batty et al. |
| 6,302,698 B1 | 10/2001 | Ziv-El |
| 6,308,199 B1 | 10/2001 | Katsurabayashi |
| 6,329,984 B1 | 12/2001 | Boss et al. |
| 6,343,313 B1 | 1/2002 | Salesky et al. |
| 6,567,813 B1 | 5/2003 | Zhu et al. |
| 6,570,590 B1 | 5/2003 | Dubrow et al. |
| 6,601,087 B1 * | 7/2003 | Zhu et al. ............... 709/204 |
| 6,654,032 B1 | 11/2003 | Zhu et al. |
| 6,674,992 B2 | 1/2004 | Helmick et al. |
| 6,691,154 B1 * | 2/2004 | Zhu et al. ............... 709/204 |
| 6,694,379 B1 | 2/2004 | Hanko et al. |

(Continued)

FOREIGN PATENT DOCUMENTS

EP    1 107 510 A2    6/2001

OTHER PUBLICATIONS http://support.microsoft.com/kb/322389, Microsoft Windows Version 5.1, Service Pack 2, Aug. 2004.*

(Continued)

*Primary Examiner* — Philip B Tran (57) ABSTRACT

In one embodiment, the methods and apparatuses display an application that is accessible on a target device; select content associated within the application wherein the content is located on the target device; and remotely access the content on the target device on a local device.

25 Claims, 7 Drawing Sheets

U.S. PATENT DOCUMENTS

| | | | |
|---|---|---|---|
| 6,757,733 B2 | 6/2004 | Gupta | |
| 6,763,501 B1 | 7/2004 | Zhu et al. | |
| 6,788,933 B2 | 9/2004 | Boehmke et al. | |
| 6,789,119 B1 | 9/2004 | Zhu et al. | |
| 6,901,448 B2 | 5/2005 | Zhu et al. | |
| 6,911,987 B1 | 6/2005 | Mairs et al. | |
| 6,925,645 B2 | 8/2005 | Zhu et al. | |
| 6,973,482 B2* | 12/2005 | Mohammed et al. | 709/229 |
| 7,028,266 B2 | 4/2006 | Ben-Shachar et al. | |
| 7,069,298 B2 | 6/2006 | Zhu et al. | |
| 7,089,279 B1 | 8/2006 | Sakaguchi | |
| 7,130,883 B2 | 10/2006 | Zhu et al. | |
| 7,203,755 B2 | 4/2007 | Zhu et al. | |
| 7,249,262 B2* | 7/2007 | Hauck et al. | 709/219 |
| 7,266,779 B2 | 9/2007 | Baek et al. | |
| 7,284,203 B1 | 10/2007 | Meeks et al. | |
| 7,305,365 B1 | 12/2007 | Bhela et al. | |
| 7,324,804 B2 | 1/2008 | Hrastar et al. | |
| 7,392,286 B2 | 6/2008 | Riddle | |
| 7,562,226 B2* | 7/2009 | Aiken et al. | 713/182 |
| 2002/0165922 A1 | 11/2002 | Wei | |
| 2002/0174181 A1 | 11/2002 | Wei | |
| 2002/0194272 A1 | 12/2002 | Zhu | |
| 2003/0048292 A1 | 3/2003 | Branson et al. | |
| 2003/0084169 A1* | 5/2003 | Zhu et al. | 709/229 |
| 2003/0085922 A1 | 5/2003 | Wei | |
| 2003/0164853 A1 | 9/2003 | Zhu et al. | |
| 2003/0167301 A1 | 9/2003 | Zhu et al. | |
| 2003/0167302 A1 | 9/2003 | Zhu et al. | |
| 2003/0167304 A1 | 9/2003 | Zhu et al. | |
| 2003/0167339 A1 | 9/2003 | Zhu et al. | |
| 2003/0167418 A1 | 9/2003 | Zhu et al. | |
| 2003/0182375 A1 | 9/2003 | Zhu et al. | |
| 2003/0189601 A1 | 10/2003 | Ben-Shachar et al. | |
| 2003/0206189 A1 | 11/2003 | DeMallo et al. | |
| 2005/0033817 A1 | 2/2005 | Wei | |
| 2005/0096048 A1 | 5/2005 | Clare et al. | |
| 2005/0125560 A1* | 6/2005 | Brockway et al. | 709/203 |
| 2005/0132045 A1 | 6/2005 | Hornback et al. | |
| 2005/0165859 A1 | 7/2005 | Geyer et al. | |
| 2005/0174975 A1* | 8/2005 | Mgrdechian et al. | 370/338 |
| 2005/0246588 A1 | 11/2005 | Deng et al. | |
| 2006/0010392 A1 | 1/2006 | Noel et al. | |
| 2006/0015580 A1 | 1/2006 | Gabriel et al. | |
| 2006/0026588 A1 | 2/2006 | Illowsky et al. | |
| 2006/0053375 A1 | 3/2006 | Humpleman et al. | |
| 2006/0073788 A1* | 4/2006 | Halkka et al. | 455/41.2 |
| 2006/0101098 A1 | 5/2006 | Morgan et al. | |
| 2006/0161622 A1 | 7/2006 | Montgomery et al. | |
| 2006/0168219 A1* | 7/2006 | Ahluwalia et al. | 709/225 |
| 2006/0253545 A1* | 11/2006 | Lakamp | 709/217 |
| 2006/0259953 A1 | 11/2006 | Earl et al. | |
| 2007/0002367 A1 | 1/2007 | Yuan | |
| 2007/0130289 A1* | 6/2007 | Defazio et al. | 709/218 |
| 2007/0180447 A1 | 8/2007 | Mazzaferri et al. | |

OTHER PUBLICATIONS http://en.wikipedia.org/wiki/Windows_XP#Service_Pack_2, Microsoft Windows Version 5.1, Service Pack 2, Aug. 2004.*
http://support.microsoft.com/kb/322389; Microsoft Windows Version 5.1 Build 2600, Service Pack 2; Aug. 24, 2001.
Paul Thurrott's SuperSite for Windows, Windows XP: The Road to Gold, Aug. 28, 2001, p. 1 and 1-11, http://web.archive.org/web/*/ http://www.winsupersite.com/reviews/windowsxp_gold3.asp.
Zhu et al., "Method for Establishing a Communication Connection Between Two or More Users via a Network of Interconnected Computers," U.S. Appl. No. 09/195,801, filed Nov. 18, 1998.

* cited by examiner

| | | |
|---|---|---|
| 1. | Participant ID | 410 |
| 2. | Friends | 420 |
| 3. | Access Rights | 430 |
| 4. | Status | 440 |

METHODS AND APPARATUSES FOR ACCESSING AN APPLICATION ON A REMOTE DEVICE

FIELD OF INVENTION

The present invention relates generally to accessing an application and, more particularly, to accessing an application on a remote device.

BACKGROUND

Systems to control a remote device located in a different location are utilized by many people. In controlling the remote device from a different location, a user is able to perform tasks on the remote device such as perform modifications to the remote device, view content accessible on the remote device, and the like without having physical access to the remote device.

SUMMARY

In one embodiment, the methods and apparatuses display an application that is accessible on a target device; select content associated within the application wherein the content is located on the target device; and remotely access the content on the target device on a local device.

BRIEF DESCRIPTION OF THE DRAWINGS

The accompanying drawings, which are incorporated in and constitute a part of this specification, illustrate and explain one embodiment of the methods and apparatuses for accessing an application on a remote device.

In the drawings.

DETAILED DESCRIPTION

The following detailed description of the methods and apparatuses for accessing an application on a remote device refers to the accompanying drawings. The detailed description is not intended to limit the methods and apparatuses for accessing an application on a remote device. Instead, the scope of the methods and apparatuses for accessing an application on a remote device is defined by the appended claims and equivalents. Those skilled in the art will recognize that many other implementations are possible, consistent with the present invention.

References to a device include a desktop computer, a portable computer, a personal digital assistant, a video phone, a landline telephone, a cellular telephone, and a device capable of receiving/transmitting an electronic signal.

In one embodiment, the methods and apparatuses for accessing an application on a remote device allow a user to view a list of devices. Further, the user is capable of selectively accessing these listed devices. In one embodiment, the user is associated with a corresponding profile that identifies the devices within the list. Further, the status of each of the listed devices is shown.

In one embodiment, the listed devices have a profile associated with each device. In one embodiment, each of the devices have restrictions on the user accessing the device. In one embodiment, there are assigned rights that restrict the type of access that is allowed by the device. In another embodiment, access to the device is restricted by other factors such as the identity of the user, the particular device that the user utilizes to gain access, the number of times the user gains access, and the duration that the user accesses the device.

In yet another embodiment, access to the device is restricted to selected application(s). For example, if the selected application is Microsoft Excel®, then any document that is capable of being viewed through Excel® can be access through this particular device.

Figure 1:
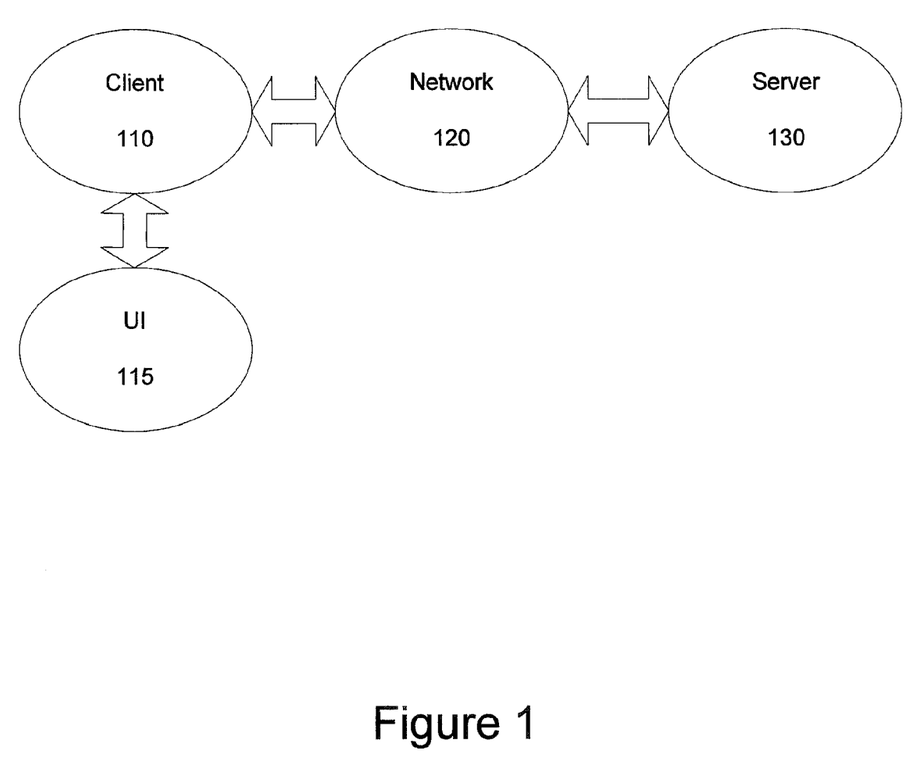
FIG. 1 is a diagram illustrating an environment within which the methods and apparatuses for accessing an application on a remote device are implemented.

FIG. 1 is a diagram illustrating an environment within which the methods and apparatuses for accessing an application on a remote device are implemented. The environment includes an electronic device 110 (e.g., a computing platform configured to act as a client device, such as a computer, a personal digital assistant, and the like), a user interface 115, a network 120 (e.g., a local area network, a home network, the Internet), and a server 130 (e.g., a computing platform configured to act as a server).

In one embodiment, one or more user interface 115 components are made integral with the electronic device 110 (e.g., keypad and video display screen input and output interfaces in the same housing such as a personal digital assistant. In other embodiments, one or more user interface 115 components (e.g., a keyboard, a pointing device such as a mouse, a trackball, etc.), a microphone, a speaker, a display, a camera are physically separate from, and are conventionally coupled to, electronic device 110. In one embodiment, the user utilizes interface 115 to access and control content and applications stored in electronic device 110, server 130, or a remote storage device (not shown) coupled via network 120.

In accordance with the invention, embodiments of selectively controlling a remote device below are executed by an electronic processor in electronic device 110, in server 130, or by processors in electronic device 110 and in server 130 acting together. Server 130 is illustrated in FIG. 1 as being a single computing platform, but in other instances are two or more interconnected computing platforms that act as a server.

Figure 2:
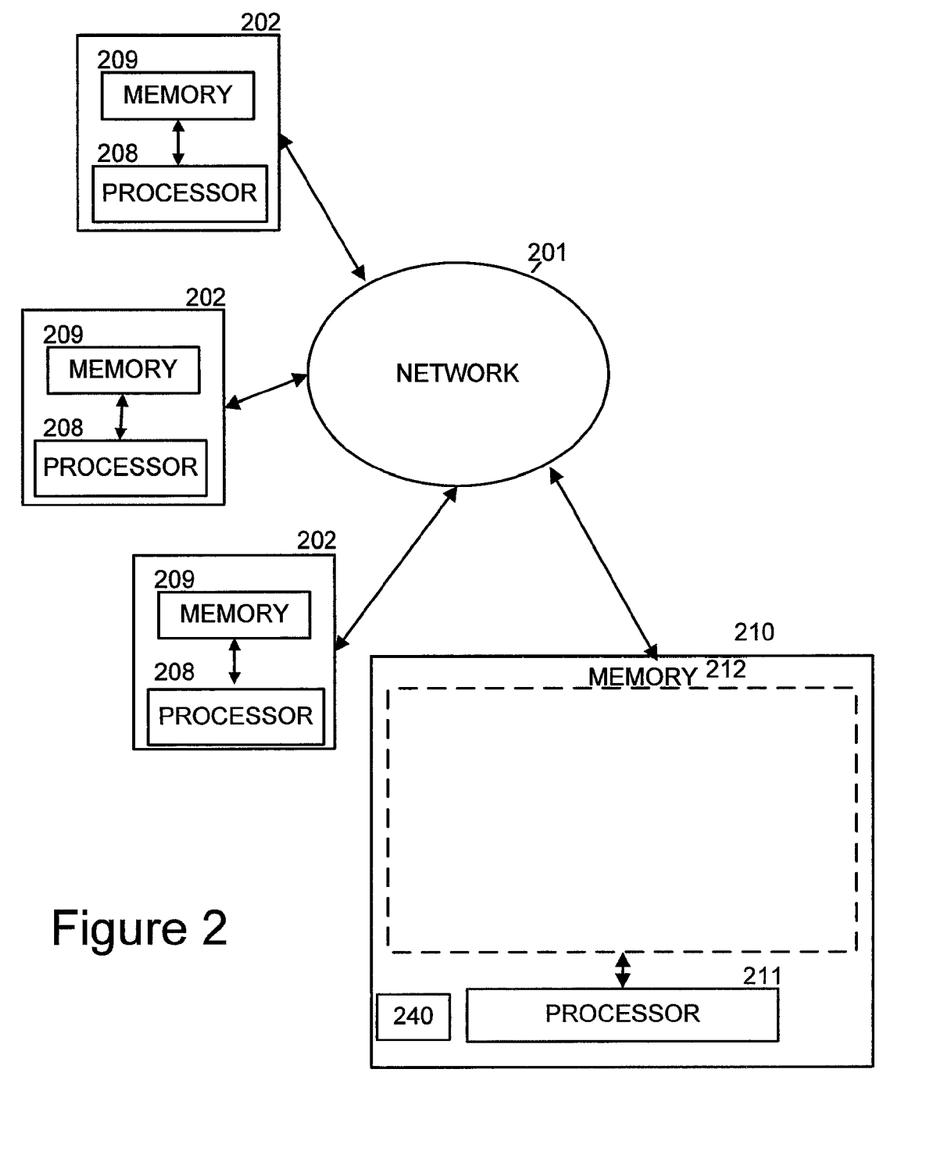
FIG. 2 is a simplified block diagram illustrating one embodiment in which the methods and apparatuses for accessing an application on a remote device are implemented.

FIG. 2 is a simplified diagram illustrating an exemplary architecture in which the methods and apparatuses for accessing an application on a remote device are implemented. The exemplary architecture includes a plurality of electronic devices 202, a server device 210, and a network 201 connecting electronic devices 202 to server 210 and each electronic device 202 to each other. The plurality of electronic devices 202 are each configured to include a computer-readable medium 209, such as random access memory, coupled to an electronic processor 208. Processor 208 executes program instructions stored in the computer-readable medium 209. In one embodiment, a unique user operates each electronic device 202 via an interface 115 as described with reference to FIG. 1.

The server device 130 includes a processor 211 coupled to a computer-readable medium 212. In one embodiment, the server device 130 is coupled to one or more additional external or internal devices, such as, without limitation, a secondary data storage element, such as database 240.

In one instance, processors 208 and 211 are manufactured by Intel Corporation, of Santa Clara, Calif. In other instances, other microprocessors are used.

In one embodiment, the plurality of client devices 202 and the server 210 include instructions for a customized application for communicating between messaging and telephony systems. In one embodiment, the plurality of computer-readable media 209 and 212 contain, in part, the customized application. Additionally, the plurality of client devices 202 and the server 210 are configured to receive and transmit electronic messages for use with the customized application. Similarly, the network 210 is configured to transmit electronic messages for use with the customized application.

One or more user applications are stored in media 209, in media 212, or a single user application is stored in part in one media 209 and in part in media 212. In one instance, a stored user application, regardless of storage location, is made customizable based on selectively controlling a remote device as determined using embodiments described below.

Figure 3:
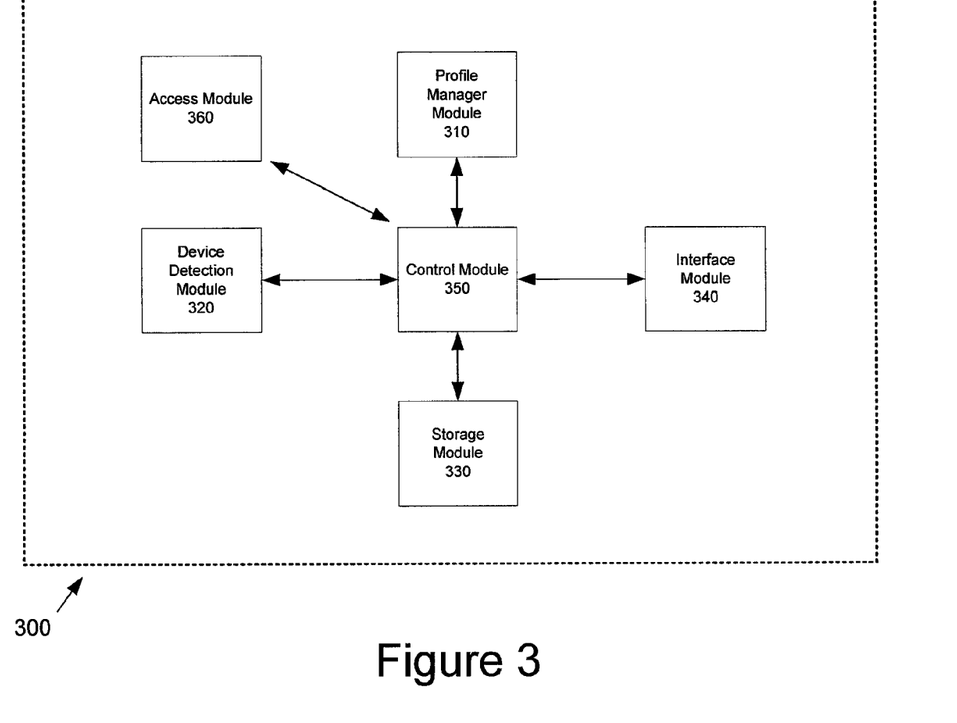
FIG. 3 is a simplified block diagram illustrating a system, consistent with one embodiment of the methods and apparatuses selectively controlling a remote device.

FIG. 3 illustrates one embodiment of a system 300. In one embodiment, the system 300 is embodied within the server 130. In another embodiment, the system 300 is embodied within the electronic device 110. In yet another embodiment, the system 300 is embodied within both the electronic device 110 and the server 130.

In one embodiment, the system 300 includes a profile manager module 310, a device detection module 320, a storage module 330, an interface module 340, a control module 350, and an access module 360.

In one embodiment, the control module 350 communicates with the profile manager module 310, the device detection module 320, the storage module 330, the interface module 340, the control module 350, and the access module 360. In one embodiment, the control module 350 coordinates tasks, requests, and communications between the profile manager module 310, the device detection module 320, the storage module 330, the interface module 340, the control module 350, and the access module 360.

In one embodiment, the profile manager module 310 organizes and tracks the profiles. In one embodiment, each profile corresponds to a device. In another embodiment, each profile corresponds with a user.

In one embodiment, the device detection module 320 detects and identifies the identity of the devices. In one embodiment, the device detection module 320 detects the identity of devices that are coupled to a network such as an intranet, the Internet, a LAN, a WAN, and the like. The network may include both wired and wireless networks.

In another embodiment, the device detection module 320 also detects the status of the device. A device status includes being available, busy, logged off, and the like.

In one embodiment, the storage module 330 stores a record including a profile associated with the each device and/or user. An exemplary profile is shown in a record 400 within FIG. 4.

In one embodiment, the interface module 340 detects input from a user. For example, when a user signs into a profile, the interface module 340 recognizes "friends" or "buddies" of the user from the profile.

In one embodiment, the access module 360 monitors the input from the user through the interface module and selectively allows the user to access other devices based on the profile associated with the user and the profile associated with each device accessed by the user. Further, the access module 360 also selectively allows the user to access selected application(s) on the other devices.

The system 300 in FIG. 3 is shown for exemplary purposes and is merely one embodiment of the methods and apparatuses for accessing an application on a remote device. Additional modules may be added to the system 300 without departing from the scope of the methods and apparatuses for accessing an application on a remote device. Similarly, modules may be combined or deleted without departing from the scope of the methods and apparatuses for accessing an application on a remote device.

Figure 4:
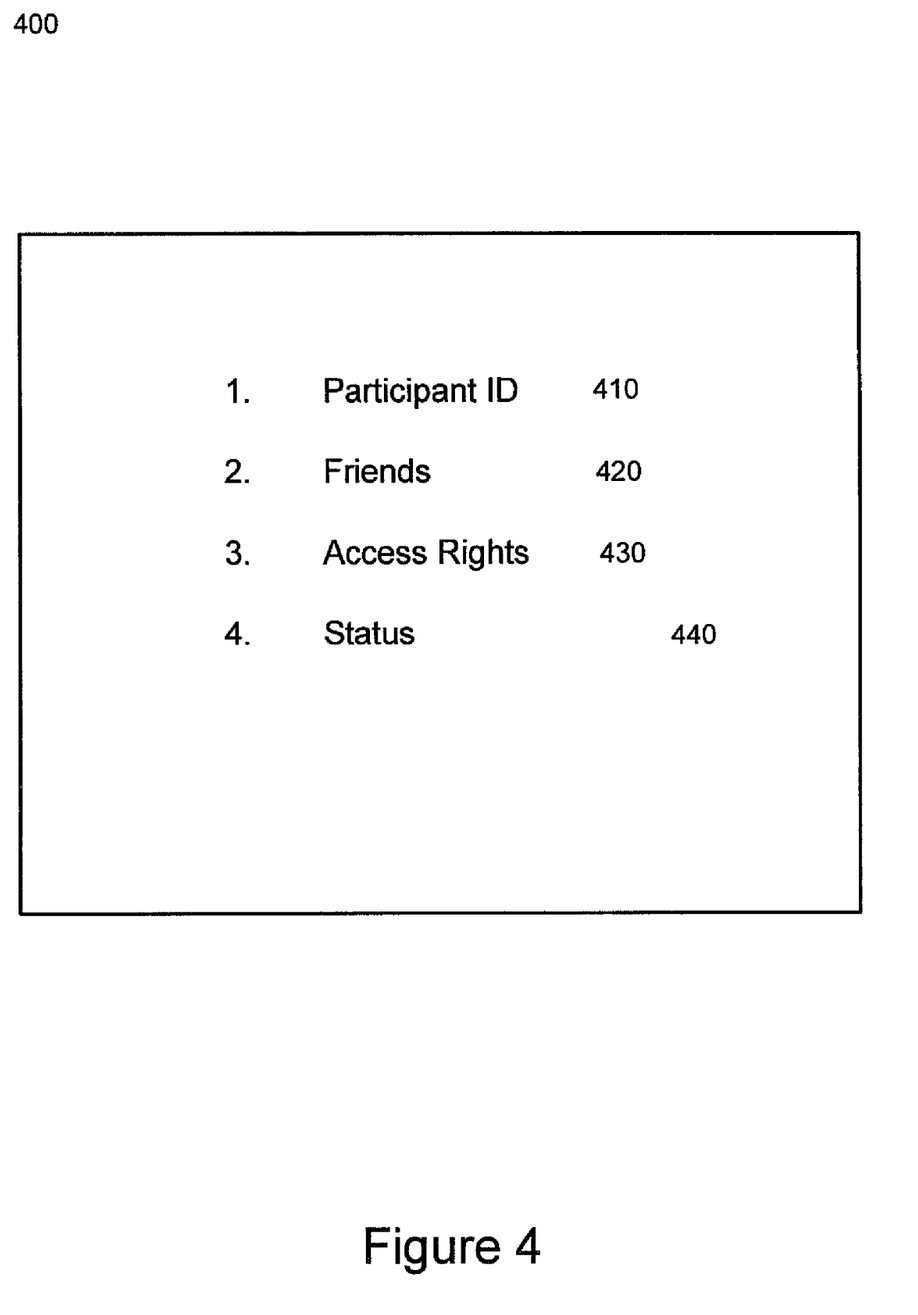
FIG. 4 is an exemplary record for use with the methods and apparatuses for accessing an application on a remote device.

FIG. 4 illustrates an exemplary record 400 for use with the methods and apparatuses for accessing an application on a remote device. In one embodiment, the record 400 illustrates an exemplary record associated with the initiation and participation of a user with a remote device.

In one embodiment, there are multiple records such that each record 400 is associated with a particular user. Further, each user may correspond with multiple records wherein each record 400 is associated with a particular profile associated with the user. In one embodiment, each record 400 is also associated with a particular device.

In one embodiment, the record 400 includes a participant identification field 410, a friends field 420, an access rights field 430, and a status field 440. In one embodiment, the record 400 resides within the client 110. In another embodiment, the record 400 resides within the server 130.

In one embodiment, the participant identification field 410 includes information related to the identity of the user. In one embodiment, the participant identification field 410 comprises an IM identifier associated with the user.

In another embodiment, the participant identification field 410 includes information related to the identity of the device. In one embodiment, the participant identification field 410 comprises a serial number associated with the device.

In one embodiment, the friends field 420 includes a listing of friends or buddies that is associated with the particular profile. For example, if the profile is associated with a particular user, then the listing of friends indicates devices or other users that are associated with the particular user. In some instances, these devices and/or users have allowed the particular user to have access to and control over corresponding devices.

For example, if the profile is associated with a particular device, then the listing of friends indicates devices or other users that are associated with the particular device. In some instances, these devices and/or users have allowed the particular device to have access to and control over corresponding devices.

In one embodiment, the devices listed within the friends field 420 are incorporated within a device list. In one embodiment, this device list represents devices that are available to another device.

In one embodiment, the access rights field 430 designates the type of access and control the user or device associated with the profile has for respective devices associated with the friends field 420.

In one embodiment, the type of access and control rights include viewing content, downloading content, changing configurations, deleting content, adding content, deleting applications, adding applications, modifying applications, and the like.

In another embodiment, the types of applications that can be accessed may also be specified. For example, an Oracle® application may be specified as the sole application that can be accessed through the remote device. In this case, only documents utilized by the specified Oracle® application on the remote device can be accessed. In one embodiment, multiple applications may be specified.

In one embodiment, the status field 440 allows a particular device or particular user that is listed within the friends field 420 to have a current status associated with that entity. For example, the status is detected through the device detection module 320. The status includes being available, busy, in a meeting, out to lunch, away from my desk, idle, unavailable, and the like.

Figure 5:
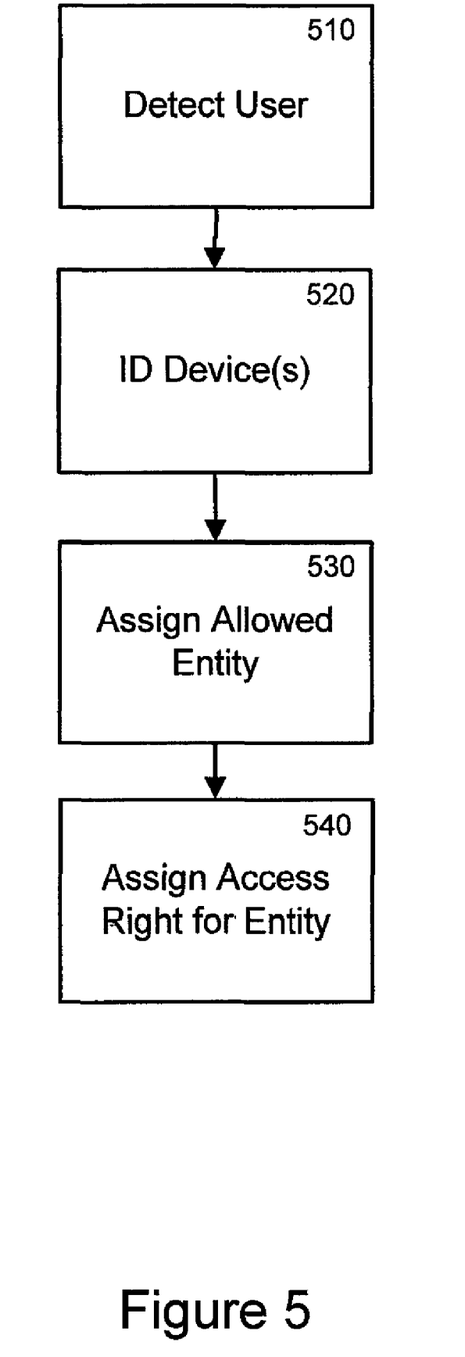
FIG. 5 is a flow diagram consistent with one embodiment of the methods and apparatuses for accessing an application on a remote device.
Figure 6:
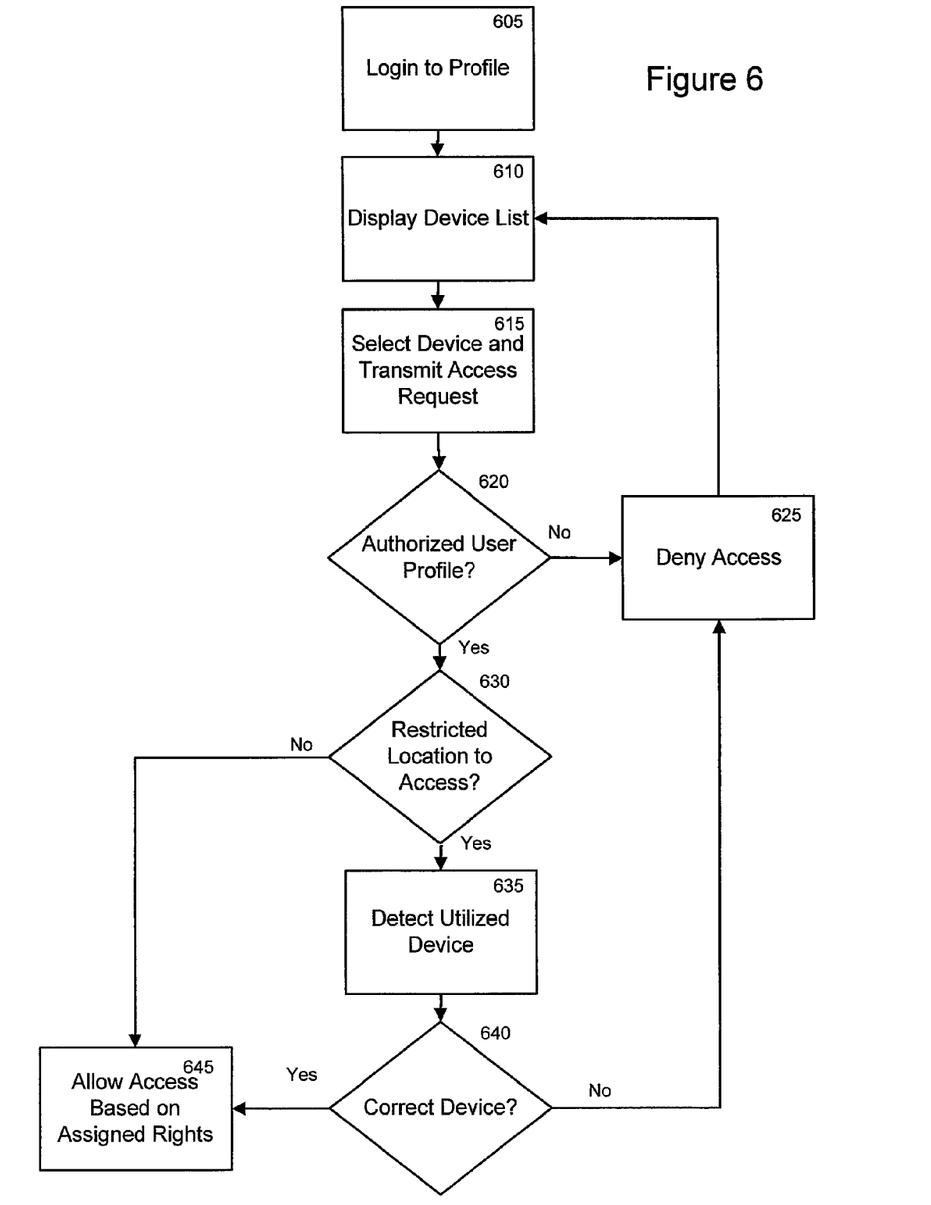
FIG. 6 is a flow diagram consistent with one embodiment of the methods and apparatuses for accessing an application on a remote device.
Figure 7:
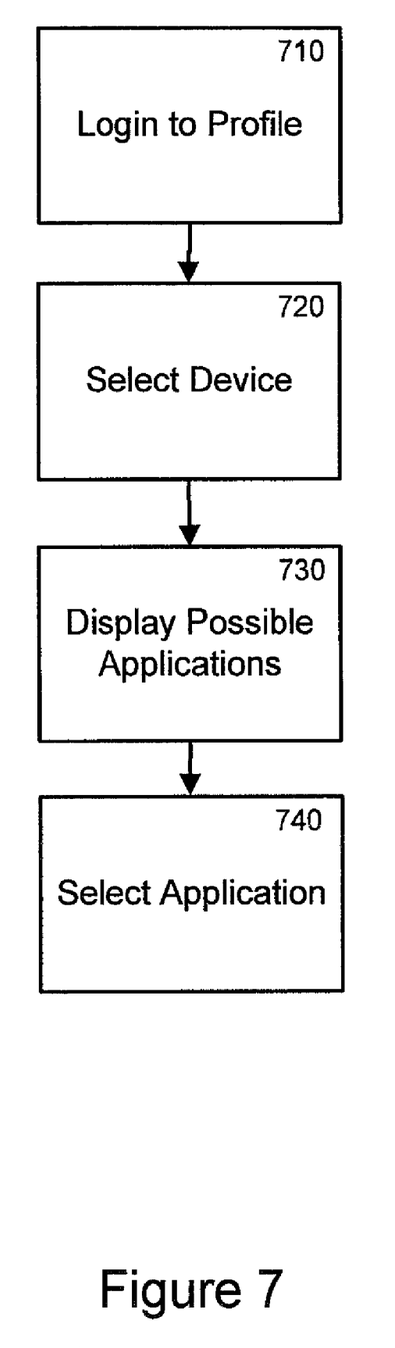
FIG. 7 is a flow diagram consistent with one embodiment of the methods and apparatuses for accessing an application on a remote device.

The flow diagrams as depicted in FIGS. 5-7 are one embodiment of the methods and apparatuses for accessing an application on a remote device. The blocks within the flow diagrams can be performed in a different sequence without departing from the spirit of the methods and apparatuses for communicating between messaging and telephony systems. Further, blocks can be deleted, added, or combined without departing from the spirit of the methods and apparatuses for accessing an application on a remote device.

The flow diagram in FIG. 5 illustrates forming a profile associated with a user according to one embodiment of the invention.

In Block 510, a user is detected. In one embodiment, the user is identified through a login identification that uniquely identifies that individual user. In another embodiment, the user utilizes a password in conjunction with the login identification to authenticate the user as an authorized party.

In one embodiment, a profile is associated with the user. An exemplary profile is shown as the record 400 in FIG. 4.

In Block 520, a device is identified that is associated with the profile corresponding to the user. In one embodiment, the device is uniquely identified by a descriptive name of the device such as "Dan's computer", "Laptop computer", and the like. In another embodiment, the device is unique identified by a unique serial number associated with the device. For example, the device may already have a unique serial number assigned at the factory that uniquely identifies that particular device.

In one embodiment, the user has control of the identified device and is able to customize the parties that can access this identified device and limit the type of access to this identified device. For example, the identified device is owned by the user.

In another embodiment, the user has no control of the identified device and utilizes the profile to request access permission from the owner of the identified device.

In Block 530, an entity is assigned access to the identified device referenced in the Block 520. In one embodiment, this entity is a different profile that corresponds to a different user. In another embodiment, this entity is a different profile that corresponds to the same user.

In one embodiment, the entity represents a user that is given access to the identified device when the user owns the identified device. In another embodiment, the entity represents a user that is being asked to give access permission to the user to access the identified device.

In Block 540, access rights are assigned to the identified device. In one embodiment, the access rights include viewing content stored on the identified device, downloading content stored on the identified device, modifying content stored on the identified device, deleting content stored on the identified device, adding content onto the identified device, utilizing applications stored on the identified device, downloading applications stored on the identified device, modifying applications stored on the identified device, deleting applications stored on the identified device, and adding applications onto the identified device. In one embodiment, any of these access rights can be assigned to the identified device. Further, particular content and/or applications can be specified to be accessible.

In one embodiment, the access rights are limited based on the number of times the identified device is accessed. For example, the access rights to the identified device are limited to being accessed a predetermined number of times prior to making the identified device inaccessible. In another embodiment, the access rights are limited based on elapsed time. For example, the access rights to the identified device are limited by a predetermined amount of time prior to rendering the identified device inaccessible.

In one embodiment, the access rights are limited to a specific application that resides on the remote device.

The flow diagram in FIG. 6 illustrates accessing a device according to one embodiment of the invention.

In Block 605, a user accesses a user profile associated with the user. In one embodiment, the user identifies the user profile through a login identification. Further, the user authenticates authorization to the user profile by providing a predetermined password associated with the user profile. In one embodiment, the user may be associated with multiple user profiles.

In Block 610, a device list is displayed. In one embodiment, the device list includes devices that are available to be viewed by the user through the user profile.

In one embodiment, the status of the devices is shown through the device list and represents whether each device is available, unavailable, and the like. In another embodiment, the access rights of each device are also shown through the device list.

In one embodiment, the device list is formatted as a textual list that identifies the identity of the device, the status of each of these device, and the access rights associated with each device.

In another embodiment, the device list is embodied within a graphical user interface that utilizes icons to graphically represent each device shown on the device list, the status of each of these devices, and the access rights associated with each device.

In Block 615, a selected device shown within the device list is selected and an access request is transmitted. In one embodiment, the user associated with the profile chooses the selected device. Further, the user associated with the profile transmits the access request to gain access to the selected device.

In Block 620, a determination is made regarding whether the profile associated with the user is authorized to access the selected device. In one embodiment, a check is performed to ensure that the profile associated with the user is authorized to access the selected device. In one embodiment, the selected device includes an associated profile that lists the authorized profiles that are allowed to access this selected device.

In one embodiment, the user is asked to verify the passwords associated with the profile prior to gaining access to the selected device.

If the profile associated with the user is not authorized to access the selected device, then access to the selected device is denied in Block 625. In one embodiment, when access is denied to the selected device, information is not exchanged between the user associated with the profile and the selected device.

After access is denied in the Block 625, the device list is displayed in the Block 610.

If the profile associated with the user is authorized to access the selected device, then access that is restricted based on the location of the user associated with the profile is checked in Block 630.

If access to the selected device is not restricted based on the location of the user associated with the profile, then access to the selected device is granted to the user in Block 645. In one embodiment, access to the selected device by the user is restricted based on the assigned rights for the particular user and the selected device. In one embodiment, the selected device includes a profile that describes the access rights assigned to particular profiles.

If access to the selected device is restricted based on the location of the user associated with the profile, then the device utilized by the user is detected in Block 635. In one embodiment, the identity of the device utilized by the user is identified through a unique serial number associated with each device.

In one embodiment, the selected device includes a profile that describes the devices that are allowed to access the selected device. For example, in addition to restricting access to the selected device based on the user and the corresponding profile, the selected device may also limit access to the selected device from other predetermined devices. In this case, if the authorized user through the corresponding profile attempts to access the selected device through an unauthorized device, then access to the selected device is denied.

In Block 640, if the device is authorized to access the selected device, then access is allowed based on the assigned rights in the Block 645. If the device is not authorized to access the selected device, then access is denied by the Block 625.

The flow diagram in FIG. 7 illustrates accessing a device according to one embodiment of the invention.

In Block 710, a user accesses a user profile associated with the user. In one embodiment, the user identifies the user profile through a login identification. Further, the user authenticates authorization to the user profile by providing a predetermined password associated with the user profile. In one embodiment, the user may be associated with multiple user profiles.

In Block 720, a device is selected. In one embodiment, a device list is displayed to the user based on the user profile associated with the user.

In Block 730, an application list is presented. In one embodiment, the application list represents a listing of any available applications associated with the device selected in the Block 720. In one embodiment, there are multiple applications within the application list. In another embodiment, there is only one application within the application list.

In Block 740, an application from the application list is selected. The selected application is accessible from the selected device. In one embodiment, content within the selected device is viewable through the selected application. Other content that cannot be utilized through the selected application is not accessible on the selected device. For example, if the selected application is a music player that only works with audio files, then content within the selected device such as text files are not accessible through the selected device. Similarly, if the selected application on the selected device is an Oracle® application that interfaces with data tables, then image files (even stored on the selected device) is not accessible.

The foregoing descriptions of specific embodiments of the invention have been presented for purposes of illustration and description. The invention may be applied to a variety of other applications.

They are not intended to be exhaustive or to limit the invention to the precise embodiments disclosed, and naturally many modifications and variations are possible in light of the above teaching. The embodiments were chosen and described in order to explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed:

1. A method comprising:
receiving a selection of a target device that is accessible to a user at a local device, wherein the target device has an associated profile identifying which users are authorized to access the target device, which local devices are authorized for use by each user to access the target device, and which one or more applications on the target device are accessible to each user;
determining, based on the profile associated with the target device, that the user is authorized to access the target device;
determining, based on the profile associated with the target device, that the local device is authorized for use by the user to access the target device;
for the target device, displaying an indication of each of the one or more applications on the target device that are accessible to the authorized user at the authorized local device;
receiving a selection of an application of the one or more applications that are accessible on the target device;
in response to the selection of the application, permitting access to particular content based on a determination that the content is associated with the selected application, wherein the particular content is located on the target device, while preventing access to other content based on a determination that the other content is not associated with the selected application, wherein the other content is also located on the target device;
remotely accessing the particular content on the target device by the local device,
wherein the profile associated with the target device identifies a predetermined number of times that the particular content on the target device may be accessed, and
restricting access to the particular content after the content has been accessed the predetermined number of times.

2. The method according to claim 1 wherein the target device is one of a computer, a telephone, a personal digital assistant, or a pager.

3. The method according to claim 1 wherein the local device is one of a computer, a telephone, a personal digital assistant, or a pager.

4. The method according to claim 1 further comprising displaying a plurality of target devices that are accessible to the local device in device list.

5. The method according to claim 1 further comprising displaying a plurality of applications accessible on the target device in an application list.

6. The method according to claim 1 further comprising displaying the particular content accessible on the target device, wherein the particular content is content of a file type that is compatible with the selected application.

7. The method according to claim 1 wherein the other content to which accesses is prevented is content of a file type that is not capable of being viewed through the selected application.

8. A method comprising:
   receiving a selection of an application of one or more applications accessible on a target device, wherein the target device has an associated profile identifying which users are authorized to access the target device, which local devices are authorized for use by each user to access the target device, and which one or more applications on the target device are accessible to each user;
   determining, based on the profile associated with the target device, that the user is authorized to access the target device;
   determining, based on the profile associated with the target device, that the local device is authorized for use by the user to access the target device;
   recognizing particular content on the target device associated with the selected application, the particular content being content capable of being viewed within the selected application;
   allowing a local device to access the particular content based on a determination that the content is association with the selected application, while preventing access to other content on the target device based on a determination that the other content is not associated with the selected application, the other content being content not capable of being viewed within the selected application,
   wherein the profile associated with the target device identifies a predetermined number of times that the particular content on the target device may be accessed, and
   restricting access to the particular content after the content has been accessed the predetermined number of times.

9. The method according to claim 8 wherein the application is one of a word processor program, a spreadsheet program, an imaging program, a database program, an audio program, or an electronic mail program.

10. The method according to claim 8 wherein selecting the application is performed by the target device.

11. The method according to claim 8 wherein selecting the application is performed by the local device.

12. The method according to claim 8 further comprising displaying the content on the local device.

13. The method according to claim 8 further comprising accessing the application from the target device on the local device.

14. The method according to claim 8 wherein the content capable of being viewed within the selected application has a particular file type and the content not capable of being viewed within the selected application has another file type.

15. The method according to claim 14 wherein the particular file type and the another file type are each one of a text file, an audio file, an image file, or a database file.

16. A system, comprising:
   a processor and a memory;
   a profile manager module configured to track a device profile associated with a target device, wherein the device profile identifies which users are authorized to access the target device, which local devices are authorized for use by each user to access the target device, and an assigned application that is accessible on the target device;
   an access module configured to selectively control access to the device by a user at a local device based on whether the profile indicates if the user is an authorized user and whether the profile indicates if the local device is an authorized local device, and based on the assigned application, to permit access to particular content on the target device based on a determination that the content is association with the assigned application, and to prevent access to other content on the target device based on a determination that the other content is not associated with the assigned application;
   an interface module configured to display a representation of the target device,
   wherein the profile associated with the target device identifies a predetermined number of times that the particular content on the target device may be accessed, and wherein the access module is configured to restrict access to the particular content after the content has been accessed the predetermined number of times.

17. The system according to claim 16 wherein the device is one of a computer, a telephone, a personal digital assistant, or a pager.

18. The system according to claim 16 further comprising a storage module configured to store the device profile.

19. The system according to claim 16 further comprising a device detection module configured for detecting a status of the device.

20. The system according to claim 16 where the assigned application includes one of a word processor, a spreadsheet, a database, or an electronic mail viewer.

21. The system according to claim 16 wherein the interface module is further configured to display the assigned application.

22. The system according to claim 16 wherein the interface module is further configured to display content associated with the assigned application.

23. The system according to claim 16 wherein the other content to which accesses is prevented is content of a file type that is not capable of being viewed through the assigned application.

24. The method according to claim 23 wherein the file type capable of being viewed within the selected application is one of a text file, an audio file, an image file, or a database file.

25. A method comprising:
   displaying a device list on a local device, the device list identifying one or more target devices that are accessible to the local device over a network, wherein each of the one or more target devices has an associated profile identifying which users are authorized to access the target device, which local devices are authorized for use by each user to access the target device, and which one or more applications on the target device are accessible to each user;
   for a particular target device of the one or more target devices, displaying an application list that identifies one or more applications stored on the particular target device that are accessible to the local device over the network;
   determining, based on the profile associated with the particular target device, that the user is authorized to access the target device;
   determining, based on the profile associated with the particular target device, that the local device is authorized for use by the user to access the target device;
   receiving a selection of an application of the one or more applications stored on the particular target device;
   in response to the selection of the selected application stored on the particular target device, permitting access to the local device to particular content stored on the particular target device based on a determination that the content is of file type capable of being viewed within the selected application, and preventing access to the local device to other content stored on the particular target device based on a determination that the other content is of a file type incapable of being viewed within the selected application;

remotely accessing, by the local device, at least some of the particular content stored on the particular target device over the network, wherein the profile associated with the target device identifies a predetermined number of times that the particular content on the target device may be accessed, and restricting access to the particular content after the content has been accessed the predetermined number of times.

* * * * *